US012446852B2

United States Patent
Abe et al.

(10) Patent No.: US 12,446,852 B2
(45) Date of Patent: Oct. 21, 2025

(54) ULTRASOUND DIAGNOSTIC APPARATUS, MEDICAL IMAGE ANALYTIC APPARATUS, AND NON-TRANSITORY COMPUTER READABLE STORAGE MEDIUM STORING MEDICAL IMAGE ANALYSIS PROGRAM

(71) Applicant: CANON MEDICAL SYSTEMS CORPORATION, Otawara (JP)

(72) Inventors: Yasuhiko Abe, Otawara (JP); Koichiro Kurita, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 444 days.

(21) Appl. No.: 17/655,438

(22) Filed: Mar. 18, 2022

(65) Prior Publication Data

US 2022/0304651 A1 Sep. 29, 2022

(30) Foreign Application Priority Data

Mar. 25, 2021 (JP) .................... 2021-051077

(51) Int. Cl.
*A61B 8/08* (2006.01)
*A61B 8/00* (2006.01)

(52) U.S. Cl.
CPC ............ *A61B 8/0883* (2013.01); *A61B 8/485* (2013.01); *A61B 8/5223* (2013.01)

(58) Field of Classification Search
CPC ...... A61B 8/0883; A61B 8/485; A61B 8/5223
See application file for complete search history.

(56) References Cited

U.S. PATENT DOCUMENTS

| 7,805,194 | B1* | 9/2010 | Schecter ............ A61N 1/36585 607/17 |
| 2003/0153823 | A1* | 8/2003 | Geiser .................. G06T 7/0012 600/407 |
| 2008/0009722 | A1* | 1/2008 | Simopoulos ............. A61B 8/08 600/437 |
| 2008/0304730 | A1 | 12/2008 | Abe |
| 2015/0038846 | A1* | 2/2015 | Abe ........................ A61B 8/14 600/443 |

(Continued)

FOREIGN PATENT DOCUMENTS

JP 2008-301920 A 12/2008
JP 2018-15558 A 2/2018

(Continued)

OTHER PUBLICATIONS

Japanese Office Action issued Jul. 23, 2024 in Japanese Patent Application No. 2021-051077, 2 pages.

*Primary Examiner* — Bo Joseph Peng
(74) *Attorney, Agent, or Firm* — Oblon, McClelland, Maier &Neustadt, L.L.P.

(57) ABSTRACT

An ultrasound diagnostic apparatus includes processing circuitry and a display. The processing circuitry is configured to concurrently obtain a plurality of cardiac function indexes for at least two or more cardiac chambers including a left ventricle and a right ventricle among cardiac chambers appearing on an apical 4-chamber moving image of a subject during one or more heartbeats, based on boundary positions of the cardiac chambers appearing on the apical 4-chamber moving image. The display displays at least one or more of the plurality of cardiac function indexes.

15 Claims, 6 Drawing Sheets

(56) References Cited

U.S. PATENT DOCUMENTS

| | | | |
|---|---|---|---|
| 2016/0147794 A1 | 5/2016 | Abe et al. | |
| 2016/0331349 A1* | 11/2016 | Abe | A61B 5/318 |
| 2017/0265843 A1* | 9/2017 | Abe | A61B 8/14 |
| 2018/0021024 A1* | 1/2018 | Fukuda | G06T 11/206 |
| | | | 382/131 |
| 2019/0008480 A1* | 1/2019 | Gerard | A61B 8/5223 |
| 2020/0323454 A1* | 10/2020 | Mihalef | A61B 5/1107 |

FOREIGN PATENT DOCUMENTS

| | | |
|---|---|---|
| JP | 6502070 B2 | 4/2019 |
| WO | WO 2020/121014 A1 | 6/2020 |

* cited by examiner

ULTRASOUND DIAGNOSTIC APPARATUS, MEDICAL IMAGE ANALYTIC APPARATUS, AND NON-TRANSITORY COMPUTER READABLE STORAGE MEDIUM STORING MEDICAL IMAGE ANALYSIS PROGRAM

CROSS-REFERENCE TO RELATED APPLICATIONS

This application is based upon and claims the benefit of priority from Japanese Patent Application No. 2021-051077, filed on Mar. 25, 2021; the entire contents of which are incorporated herein by reference.

FIELD

Embodiments described herein relate generally to an ultrasound diagnostic apparatus, a medical image analytic apparatus, and a non-transitory computer readable storage medium storing a medical image analysis program.

BACKGROUND

Traditionally, cardiac functions can be assessed by a technique called speckle-tracking (ST) using moving images of the heart captured by an ultrasound diagnostic apparatus or a cardiac-MRI. There are two types of speckle-tracking, that is, three-dimensional (3D) ST using 3D data and two-dimensional (2D) ST using 2D planar data. Typically, one of the cardiac chambers is subjected to analysis by both of the ST methods. Owing to the recent prevalence of the ST methods, it becomes possible to know the relevance between the left and right sides of the heart and among the cardiac chambers based on function information on two or more cardia chambers. As such a known method of analyzing two or more cardiac chambers, a concept of concurrent analysis of volume data of the four cardiac chambers is presented. Examples of such a technique include concurrent display of volume variation curves of the left ventricle and the left atrium, and quad chamber tracking (QCT). QCT allows analysis of the individual cardiac chambers by 2DST or 3DST and input of results of the analysis of two or more of the cardiac chambers to present possible analytic functions in an automatically switchable manner.

Such a traditional concurrent analysis of the volume data of the four cardiac chambers, however, requires a two-dimensional array structure to obtain 3D data, therefore, 2D data (planar image), which a lower-cost apparatus can provide, is unusable for the analysis. Also, according to QCT, the results are individually prepared for input, that is, analytic results of two or more cardiac chambers cannot be concurrently prepared, which is time-consuming.

DETAILED DESCRIPTION

Figure 1:
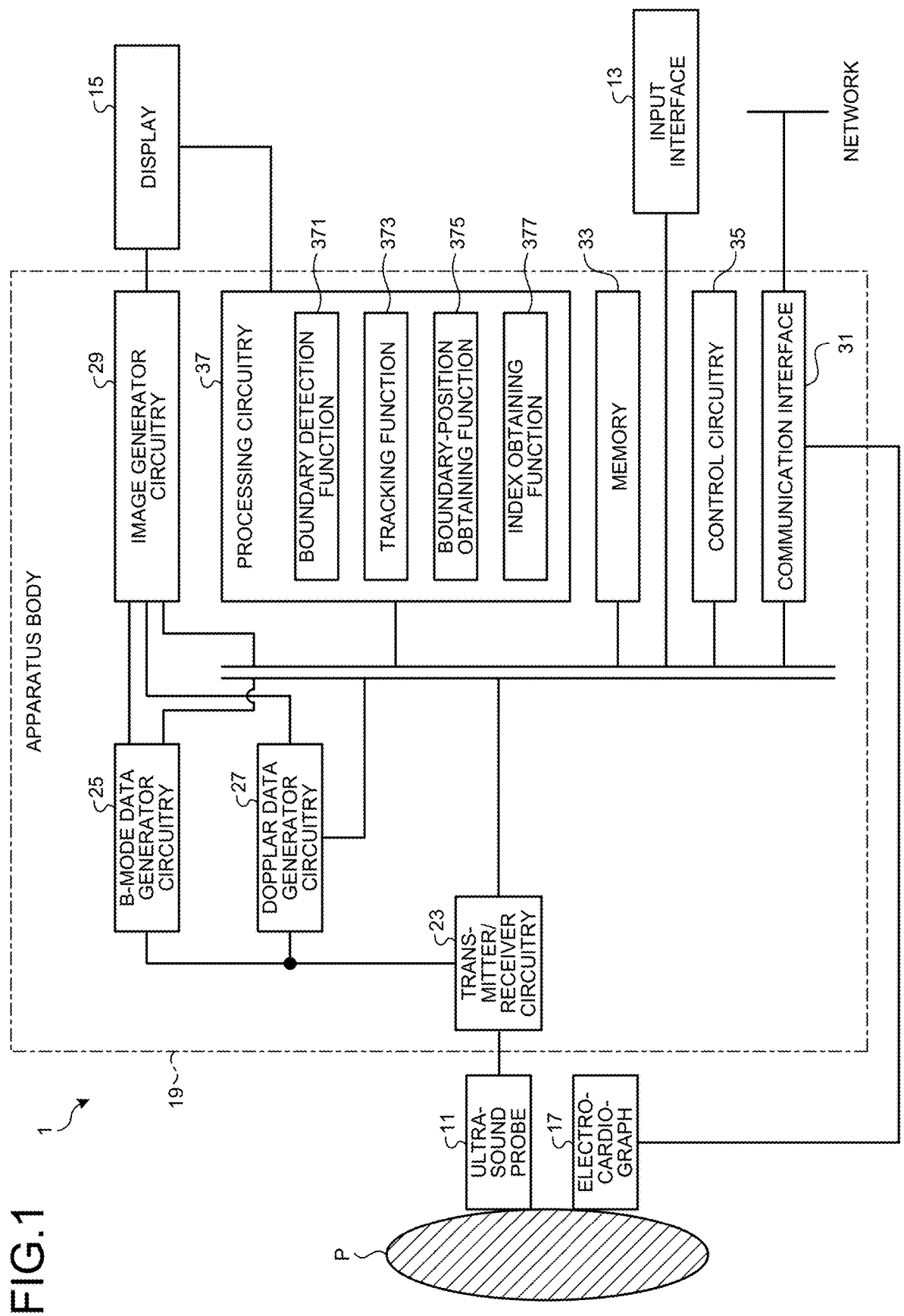
FIG. 1 illustrates an exemplary structure of an ultrasound diagnostic apparatus according to a first embodiment.

According to one embodiment to be described below, an ultrasound diagnostic apparatus includes processing circuitry and a display. The processing circuitry is configured to concurrently obtain a plurality of cardiac function indexes for at least two or more cardiac chambers including a left ventricle and a right ventricle among cardiac chambers appearing on an apical 4-chamber moving image of a subject during one or more heartbeats, based on boundary positions of the cardiac chambers appearing on the apical 4-chamber moving image. The display displays at least one or more of the plurality of cardiac function indexes.

Hereinafter, an ultrasound diagnostic apparatus, a medical image analytic apparatus, and a medical image analysis program according to some embodiments will be described with reference to the accompanying drawings. For the sake of specific explanation, an ultrasound diagnostic apparatus will be described in a first embodiment by way of example. In the following embodiments, parts, portions, elements, or functions denoted by the same reference numerals are considered to perform same or similar processing, and an overlapping explanation thereof will be omitted when appropriate.

First Embodiment

FIG. 1 illustrates an exemplary structure of an ultrasound diagnostic apparatus 1 according to the first embodiment. As illustrated in FIG. 1, the ultrasound diagnostic apparatus 1 includes an ultrasound probe 11, an input interface (input) 13, a display (display unit) 15, an electrocardiograph 17, and an apparatus body 19.

The ultrasound probe 11 includes a plurality of piezoelectric vibrators, matching layers formed on the ultrasound emissive sides of the respective piezoelectric vibrators, and backing materials covering the back sides of the respective piezoelectric vibrators to prevent ultrasonic waves from propagating backward through the piezoelectric vibrators, for example. Each of the piezoelectric vibrators serves to generate ultrasonic waves in response to a drive signal from a later-described transmitter/receiver circuitry 23. The ultrasound probe 11 is, for example, a one-dimensional array probe detachably connected to the apparatus body 19. The ultrasound probe 11 may be equipped with a button which is pressed for a freeze operation or other operations.

The ultrasound probe 11 transmits ultrasonic waves to a subject P. The transmitted ultrasonic waves are consecutively reflected at the discontinuous planes of acoustic impedance through the body tissues of the subject P. The reflected ultrasonic waves, i.e., a reflected wave signal (hereinafter, referred to as echo signal), are received by the piezoelectric vibrators of the ultrasound probe 11. The amplitude of the received echo signal depends on differences in acoustic impedance among the discontinuous planes reflecting the ultrasonic waves. When the transmitted ultrasonic pulses are reflected by a moving object such as a bloodstream or the heart wall surface, the echo signal undergoes a frequency shift due to the Doppler effect depending on a velocity component of the moving object with respect to the transmission direction of the ultrasonic waves. The ultrasound probe 11 receives and converts the echo signal from the subject P into an electric signal.

The input interface 13 serves to allow the operator to input various kinds of instructions, commands, information selections, and settings to the ultrasound diagnostic apparatus 1. The input interface 13 is implemented by, for example, a trackball, a switch button, a mouse, a keyboard, a touch pad that allows the operator to perform input operation by touching the operational surface, and a touch panel display being an integrated display screen and touch pad. The input interface 13 receives and converts inputs from the operator to electric signals. In this disclosure the input interface 13 is not limited to the one including physical operational component or components such as a mouse and a keyboard. Examples of the input interface 13 include electric-signal processing circuitry that receives an electric signal corresponding to an input from an external input device independent from the ultrasound diagnostic apparatus 1, and outputs the electric signal to the apparatus body 19.

The display 15 can be, for example a liquid crystal display (LCD), a cathode ray tube (CRT) display, an organic electro luminescence display (OELD), a plasma display, or any other display if appropriate. The display 15 may be incorporated in the apparatus body 19. Further, the display 15 may be a desktop display or may include a tablet terminal wirelessly communicable with the apparatus body 19.

The display 15 serves to display various kinds of images generated by, for example, image generator circuitry 29 as later described. The display 15 includes display circuitry that implements various kinds of image display. The display 15 also displays a graphical user interface (GUI) that allows the operator to input various kinds of setting requests. Alternatively, a plurality of displays may be connected to the apparatus body 19 of the ultrasound diagnostic apparatus 1.

The electrocardiograph 17 is connected to the apparatus body 19 through a communication interface 31. The electrocardiograph 17 obtains an electrocardiogram (ECG) of the subject P, that is, a biosignal of the subject P scanned with the ultrasonic waves. The electrocardiograph 17 outputs the electrocardiogram to the apparatus body 19.

The apparatus body 19 includes the transmitter/receiver circuitry (transmitter/receiver unit) 23, B-mode data generator circuitry (B-mode data generator unit) 25, dopplar data generator circuitry (dopplar data generator unit) 27, image generator circuitry (image generator unit) 29, the communication interface 31, a memory (storage) 33, control circuitry (control unit) 35, and processing circuitry (processing unit) 37.

The transmitter/receiver circuitry 23 includes a pulse generator, transmission delay circuitry, and pulsar circuitry, to individually supply drive signals to the piezoelectric vibrators of the ultrasound probe 11. The pulse generator serves to repeatedly generate rate pulses for forming ultrasonic transmission waves at a given rate frequency fr (Hz) (cycle: 1/fr second). The transmission delay circuitry serves to converge the ultrasonic transmission waves in a beam form and apply a necessary delay time to each of the rate pulses in order to set transmission directivity. The pulsar circuitry serves to apply a voltage pulse as a drive signal to each of the piezoelectric vibrators of the ultrasound probe 11 at timing based on each rate pulse. Thereby, an ultrasonic beam is transmitted to the subject P.

The transmitter/receiver circuitry 23 further includes a preamplifier, an analog to digital (A/D) converter, reception delay circuitry, and an adder. The transmitter/receiver circuitry 23 generates a reception signal from a reception echo signal generated by each piezoelectric vibrator. The preamplifier obtains the echo signal from the subject P through the ultrasound probe 11 and amplifies the echo signal in each channel. The A/D converter converts the amplified reception echo signal to a digital signal. The reception delay circuitry applies a necessary delay time to the digital reception echo signal in order to set reception directivity. The adder adds multiple echo signals given respective delay times. By this addition, the transmitter/receiver circuitry 23 generates a reception signal having an enhanced reflective component from the direction corresponding to the reception directivity. General directivity of the ultrasonic transmission and reception is determined by the transmission directivity and the reception directivity, and the ultrasonic beam (i.e., ultrasonic scanning line) is set by the general directivity.

The B-mode data generator circuitry 25 includes an envelope detector and a logarithm converter, to generate B-mode data in accordance with a reception signal. The envelop detector serves to perform envelop detection to the reception signal. The logarithm converter serves to perform logarithm conversion to the reception signal after the envelop detection to relatively enhance a weak signal in this signal. The B-mode data generator circuitry 25 serves to generate a signal value (referred to as B-mode data) for a depth of each scanning line in accordance with the signal enhanced by the logarithm converter.

Specifically, the B-mode data generator circuitry 25 generates two-dimensional B-mode data by two-dimensional scanning. The B-mode data is, for example, generated by two-dimensional ultrasonic scanning (hereinafter referred to as apical four-chamber scanning) of a plane of the subject P from the cardiac apex to two or more cardiac chambers (apical four-chamber view). The two or more cardiac chambers are at least two of the four cardiac chambers. For the sake of specific explanation, in the following the B-mode data is defined as data generated by the apical four-chamber scanning (hereinafter referred to as apical 4-chamber data) to be associated with the time phase of the electrocardiogram at the time of the apical four-chamber scanning. The four cardiac chambers are left atrium (LA), left ventricle (LV), right atrium (RA), and right ventricle (RV).

The dopplar data generator circuitry 27 includes a mixer and a low pass filter (hereinafter, LPF), to generate dopplar data according to the reception signal. The mixer serves to generate a signal having a component with a dopplar shifted frequency fd and a signal having a frequency component (2f0+fd) by multiplying the reception signal by a reference signal with a frequency f0 of the ultrasonic transmission waves. The LPF serves to remove a signal with the high frequency component (2f0+fd) from the signal output from the mixer. In this manner the dopplar data generator circuitry 27 generates dopplar data having a component with the dopplar shifted frequency fd out of the reception signal.

The image generator circuitry 29 includes a digital scan converter (hereinafter, DSC) and an image memory, both of which are not illustrated. The DSC functions to convert a sequence of ultrasonic scanning-line signals including B-mode data and dopplar data into a sequence of scanning-line signals of a video format (scan conversion). The image generator circuitry 29 generates ultrasonic image data by synthesizing the scan converted B-mode data and dopplar data with text information, scales, and other information of various parameters. The ultrasonic image data serves as display data. The ultrasonic image is an exemplary medical image. The ultrasonic image data is exemplary medical data. B-mode data, volume data, and dopplar data are also referred to as raw data. The image memory stores therein a plurality of ultrasonic images corresponding to a series of frames immediately prior to a freeze operation (hereinafter, referred to as ultrasonic moving images). The ultrasonic moving images stored in the image memory are used for cine-mode display.

As an example, the image generator circuitry 29 generates an ultrasonic moving image in at least one or more heartbeats (hereinafter, referred to as apical 4-chamber moving image) based on apical 4-chamber data generated by the apical four-chamber scanning of the subject P in the one or more heartbeats. The generated apical 4-chamber moving image is stored in the image memory, together with cardiac cycle phases in the electrocardiogram, for use in cine-mode display when appropriate. Further, the image generator circuitry 29 stores the apical 4-chamber moving image in the memory 33.

The communication interface 31 connects to external devices such as a medical image storage device through a network. The communication interface 31 receives ultrasonic image data on the four cardiac chambers of the subject P from the medical image storage device and outputs it to the memory 33. The communication interface 31 also transfers various kinds of data from the image generator circuitry 29 and the processing circuitry 37 to the external devices.

The memory 33 includes a hard disk drive (HDD), a solid state drive (SSD), a magnetic disk such as a floppy (registered trademark) disk or a hard disk, or an optical disk such as CD-ROM or DVD, or a semiconductor memory. The memory 33 stores ultrasonic transmission/reception programs and various kinds of programs for the processing to be executed by the control circuitry 35 and the processing circuitry 37, for example. The memory 33 further stores raw data, ultrasonic image data, and various kinds of data generated and/or processed by the processing circuitry 37.

The control circuitry 35 includes hardware resources such as a processor and a memory. The control circuitry 35 functions as the center of the ultrasound diagnostic apparatus 1. Specifically, the control circuitry 35 reads and loads a control program from the memory 33 onto the memory and controls the respective units of the ultrasound diagnostic apparatus 1 in accordance with the control program.

The processing circuitry 37 includes hardware resources such as a processor and a memory. Specifically, the processing circuitry 37 reads and loads a program from the memory 33 onto the memory to implement respective functions in accordance with the program. The processing circuitry 37 includes a boundary detection function 371, a tracking function 373, a boundary-position obtaining function 375, and an index obtaining function 377. The boundary detection function 371, the tracking function 373, the boundary-position obtaining function 375, and the index obtaining function 377 implemented by the processing circuitry 37 corresponds to a boundary detector unit, a tracking unit, a boundary-position obtainer unit, and an index obtainer unit, respectively. In response to receipt of an instruction for obtaining an index representing a cardiac function of at least two or more cardiac chambers (hereinafter, referred to as cardiac function index) on the apical 4-chamber moving image via the input interface 13, the processing circuitry 37 executes an index obtaining process using the boundary detection function 371, the tracking function 373, the boundary-position obtaining function 375, and the index obtaining function 377. The index obtaining process refers to a process of obtaining a cardiac function index for the subject P based on the apical 4-chamber moving image for display. Input of an instruction for obtaining the cardiac function index is exemplified by pressing an execution button for the index obtaining process.

The cardiac function index includes cavity volume and fractional volume change with respect to the left ventricle, the left atrium, and the right atrium as well as cavity area and fractional area change with respect to the right ventricle. The cardiac function index further includes global longitudinal strain (GLS) of the cardiac wall for the left ventricle, the left atrium, and the right atrium, and GLS of the free wall for the right ventricle among the four chambers. Herein, the free wall corresponds to the cardiac wall excluding the septum. The cardiac function index further includes left atrium volume index for the left atrium and tricuspid annular plane systolic excursion for the right ventricle.

The boundary detection function 371 of the processing circuitry 37 serves to automatically detect, on the apical 4-chamber moving image, a boundary group representing positions of the boundaries among the cardiac chambers in at least one or more cardiac cycle phases. Specifically, the boundary detection function 371 reads the apical 4-chamber moving image in one or more heartbeats from the memory 33, responding to the execution button for the index obtaining process being pressed. In addition the boundary detection function 371 reads from the memory 33 a knowledge-based database (hereinafter, referred to as knowledge-based dictionary) constructed by machine learning of a deep neural network (hereinafter, DNN). Alternatively, the boundary detection function 371 may select a knowledge-based dictionary applicable to the apical 4-chamber moving image from among different kinds of knowledge-based dictionaries, in response to receipt of a user's selection instruction through the input interface 13 in accordance with a type of modality of the apical 4-chamber moving image, an expert's name who provides teaching in machine learning, a resolution of the apical 4-chamber moving image, and else.

The boundary detection function 371 identifies, from the read apical 4-chamber moving image, an ultrasonic image generated from apical 4-chamber data in end diastolic (ED) phase and end systolic (ES) phase, which correspond to an R-wave and an ST elevation part in the electrocardiogram, respectively. The ES phase is typically defined as a time phase a given length of time after the ED phase by a function of heartbeat rate. The boundary detection function 371 detects a group of boundary positions between or among two or more cardiac chambers on the identified ultrasonic image (hereinafter, referred to as initial boundary image), using a knowledge-based dictionary. Specifically, the boundary detection function 371 uses a knowledge-based ED-phase dictionary based on the results of machine learning to concurrently detect the individual boundary positions among the four cardiac chambers on the initial boundary image in the ED phase and treat the boundary positions of two or more of the cardiac chambers as a boundary group.

Before detecting the boundary group, the boundary detection function 371 can detect all of the four cardiac chambers when the display depth of the heart concerned is sufficiently large on the apical 4-chamber image being the initial boundary image. If the display depth is not sufficient and the left atrium and the right atrium are not rendered on the apical 4-chamber image, however, the boundary detection function 371 detects the left ventricle and the right ventricle alone. In this regard, the boundary detection function 371 defines statuses, detected and undetected, with respect to the cardiac chambers on the initial boundary image. In the index obtaining process the detected cardiac chambers alone are subjected to the analysis subsequent to the processing by the boundary detection function 371. Such detection or non-detection of the cardiac chambers is notified to the user through display of the cardiac function indexes on the display 15. A typical example of the display on the display 15 is such that checkboxes for the four chambers (LV (left ventricle), LA (left atrium), RV (right ventricle), and RA (right atrium)) are displayed in a checked (detected) or grayed-down (undetected) state.

The tracking function 373 of the processing circuitry 37 serves to track a boundary group on the apical 4-chamber moving image in the remaining cardiac cycle phase different from the one at the time of the automatic detection of the boundary group. Thus, the tracking function 373 uses known two-dimensional speckle tracking (2DST) to track a boundary group on the apical 4-chamber moving image in the remaining cardiac cycle phase in time series from the ED phase. Specifically, the tracking function 373 defines the boundary group detected in the ED phase as an initial profile, and tracks the positions of the initial profile of each cardiac chamber in a given interval (time domain of definition) while inferring the motion of the cardiac chambers by processing including pattern matching. In the first embodiment the time domain of definition is set to a one-heartbeat interval corresponding to an R-R interval in the electrocardiogram.

The boundary-position obtaining function 375 of the processing circuitry 37 serves to obtain the boundary positions of the two or more cardiac chambers in an interval of at least one or more heartbeats through tracking of the boundary group. For example, the boundary-position obtaining function 375 concurrently obtains the individual boundary positions of two or more cardiac chambers in the entire time domain of definition by arranging results of the boundary-group tracking in time series for each of the cardiac chambers concerned.

The index obtaining function 377 of the processing circuitry 37 serves to concurrently obtain cardiac function indexes for the two or more cardiac chambers. The cardiac function indexes are defined by the boundary positions of the cardiac chambers. The index obtaining function 377 concurrently obtains the cardiac function indexes for at least two or more cardiac chambers including the left ventricle and the right ventricle among the cardiac chambers appearing on the apical 4-chamber moving image of the subject P during one more heartbeats, based on the boundary positions of the cardiac chambers appearing on the apical 4-chamber moving image. As an example, the index obtaining function 377 concurrently obtains the cardiac function indexes for the four chambers appearing on the apical 4-chamber moving image. The following will describe the definitions of the cardiac function indexes for the four chambers.

Typical examples of the cardiac function index for use in the cardiac diagnosis of the subject P include information (size information) on the size (volume or area) of the cardiac chambers, and GLS as a wall motion index. As exemplary size information on the cardiac chambers except for the right ventricle, fractional volume change, i.e., ejection fraction (EF) of the left ventricle and emptying fraction (EF) of the left and right atria, is defined using a volume on a single view found by the disk summation method or area-length method, as follows:

LVEF=100*(LV maximum volume−LV minimum volume)/LV maximum volume [%]

LAEF=100*(LA maximum volume−LA minimum volume)/LA maximum volume [%]

RAEF=100*(RA maximum volume−RA minimum volume)/RA maximum volume [%].

As for the size information on the right ventricle, it is difficult to estimate a volume thereof from a single view of the apical 4-chamber moving image, therefore, right ventricular fractional area change (RVFAC) representing a ratio of the cavity areas is used as the size information.

RVFAC=100*(RV maximum cavity area−RV minimum cavity area)/RV maximum cavity area [%]

In addition, left atrium volume index (LAVI) is commonly used as the size information on the left atrium. LAVI may be defined together with LAV (LA maximum volume).

LAVI=LAV/body surface area [mL/m2] where LAV=LA maximum volume

The body surface area is of the subject P. The index obtaining function 377 substitutes the height and weight of the subject P into an estimate equation for the body surface area when registered patient formation includes the height and weight of the subject P. If registered patient formation does not include the height and weight of the subject P, the index obtaining function 377 obtains LAV instead.

As with the left atrium, right atrium volume index (RAVI) may be defined as the size information on the right atrium together with RA maximum volume (RAV).

RAVI=RAV/body surface area [mL/m2] where RAV=RA maximum volume.

The index obtaining function 377 obtains LVEF, LAEF, RAEF, RVFAC, LAVI, LAV, RAVI, and RAV as defined above as cardiac function index values, based on the boundary positions between or among two or more cardiac chambers during an interval of at least one or more heartbeats.

As exemplary GLS, LVGLS [%] is defined by Peak definition or end-systolic definition as disclosed in Reference (1), Voigt J U et al, Journal of the American Society of Echocardiography 2015; 28: 183-93. As for the right ventricle, free wall GLS, i.e., right ventricle free wall longitudinal strain (RVFWSL) [%] is defined as disclosed in Reference (2), Badano L P et al, European Heart Journal, Cardiovascular Imaging (2018) 19, 591-600. Further, LASr [%] of the left atrium and RASr [%] of the right atrium are defined as disclosed in Reference (2).

LVGLS=100*(LV circumference ($t$=peak phase)−LV circumference (ED))/LV circumference (ED) [%]

RVFWSL=100*(RV free wall length ($t$=peak phase)−RV free wall length (ED))/RV free wall length (ED) [%]

LASr=100*(LA circumference ($t$=peak phase)−LA circumference (ED))/LA circumference (ED) [%]

RASr=100*(RA circumference ($t$=peak phase)−RA circumference (ED))/RA circumference (ED) [%]

The circumferences of the four cardiac chambers (LV, LA, RV, RA) are represented as a temporal function. The peak phase corresponds to a time phase of a peak value of a GLS time-variable curve found based on the boundary positions of the cardiac chambers. The index obtaining function 377 calculates the circumferences of the four cardiac chambers (LV, LA, RV, RA) using the time phase of the peak value and the ED phase to find the cardiac function indexes LVGLS, RVFWSL, LASr, and RASr.

Moreover, tricuspid annular plane systolic excursion (TAPSE) is a typical right ventricular wall motion index. Thus, the index obtaining function 377 may define TAPSE together with RVFWSL. TAPSE can be defined by a distance D(t) between a probe position (Dap(t)) and a tricuspid annular position Dtv(t) on the free wall side on the apical 4-chamber moving image at time t. Preferably, the distance D(t) may be a maximum value in a heartbeat. Specifically, the index obtaining function 377 uses the maximum value D(t) in a heartbeat to find TAPSE. In addition, Dtv(t) represents a tricuspid annular portion at the boundary of the right ventricle.

TAPSE=D(ED)-D(t) [mm] where D(t)=|Dap(t)-Dtv(t)| [mm]

The index obtaining function 377 calculates, for example, a distance D(t) and a distance D(ED) in ED phase during one heartbeat. The index obtaining function 377 then identifies the maximum distance of the distances D(t) in the heartbeat. The index obtaining function 377 subtracts the maximum distance from the distance D(ED) in ED phase to obtain TAPSE as a cardiac function index.

Further, the index obtaining function 377 obtains, as a relevance index indicating a cardiac function index relevant to two or more cardiac chambers, at least either of a time difference (peak-time difference) at the peaks of the index values and a difference in peak index values of the cardiac functions of two or more cardiac chambers in the same heartbeat. Herein, the term "relevance" refers to a relationship or connection proved by assessment of the amount of a delay based on the peak timing of the cardiac function index and/or assessment of peak-value comparison. That is, as to the size information on different cardiac chambers and the GLS time-variable curves, the peak-time difference dt [msec], the peak-value difference dp [%], and the ratio of peak-value differences Rdp [%] are given as secondary, i.e., relevant, wall motion indexes. The secondary wall motion index corresponds to the above relevance index representing a difference in wall motion index between or among two or more cardiac chambers. The peak time refers to a time at which the GLS time-variable curve shows a peak.

Preferably, the peak-time difference dt may be defined as a peak-time difference dt_LV-RV between the left ventricle and the right ventricle or as a peak-time difference dt_LV-LA between the left ventricle and the left atrium, for instance. In addition to dt_LV-RV and dt_LV-LA, a maximum peak-time difference max-dt (difference between a latest peak time and an earliest peak time) of detected cardiac chambers may also be defined.

The peak-value difference dp may be preferably defined as a difference between the left ventricle and the right ventricle or a difference between the left ventricle and the left atrium. The following GLS relevance indexes are defined, as an example:

dp_GLS_LV-RV=LVGLS-RVFWSL [%]

dp_GLS_LV-LA=LVGLS-LASr [%].

The ratio of peak-value differences Rdp [%] may be preferably found with reference to the left ventricle. The following GLS relevance indexes are defined, as an example:

Rdp_GLS_LV-RV=100*(LVGLS-RVFWSL)/LVGLS [%]

Rdp_GLS_LV-LA=100*(LVGLS-LASr)/LVGLS [%].

The index obtaining function 377 obtains the peak-time difference dt such as dt_LV-RV, dt_LV-LA, and max-dt from the times at which the GLS time-variable curves of the cardiac chambers (LV, LA, RV, RA) show respective peak values. The index obtaining function 377 also obtains dp_GLS_LV-RV, dp_GLS_LV-LA, Rdp_GLS_LV-RV, and Rdp_GLS_LV-LA from the respective peak values of the GLS time-variable curves of the cardiac chambers (LV, LA, RV, RA).

The secondary wall-motion index as the relevance index can be a statistic representative value of primary wall-motion index values being a cardiac function index among the cardiac chambers. Preferable examples of the statistic representative value include, but are not limited to, a mean value or a standard deviation of peak times with respect to the cardiac chambers. The index obtaining function 377 obtains relevance indexes, i.e., a mean value of peak-time differences among the maximum four cardiac chambers and a standard deviation from the mean value and the maximum four peak-time differences.

The term "processor" used in the explanation of the control circuitry 35 and the processing circuitry 37 refers to the following circuits, by way of example: a central processing unit (CPU), a graphics processing unit (GPU), an application specific integrated circuit (ASIC), a programmable logic device (e.g., simple programmable logic device (SPLD)), a complex programmable logic device (CPLD), and a field programmable gate array (FPGA)).

The processor serves to implement various kinds of functions by reading and executing programs from the memory 33. Various programs may be directly embedded in the processor circuit of the control circuitry 35 or the processing circuitry 37, in place of being stored in the memory 33. In this case the processor implements various kinds of functions by reading and executing the programs from the processor circuit. The functions to be executed by the processing circuitry 37 may be incorporated in the control circuitry 35. Alternatively, the functions to be executed by the control circuitry 35 may be incorporated in the processing circuitry 37.

Figure 2:
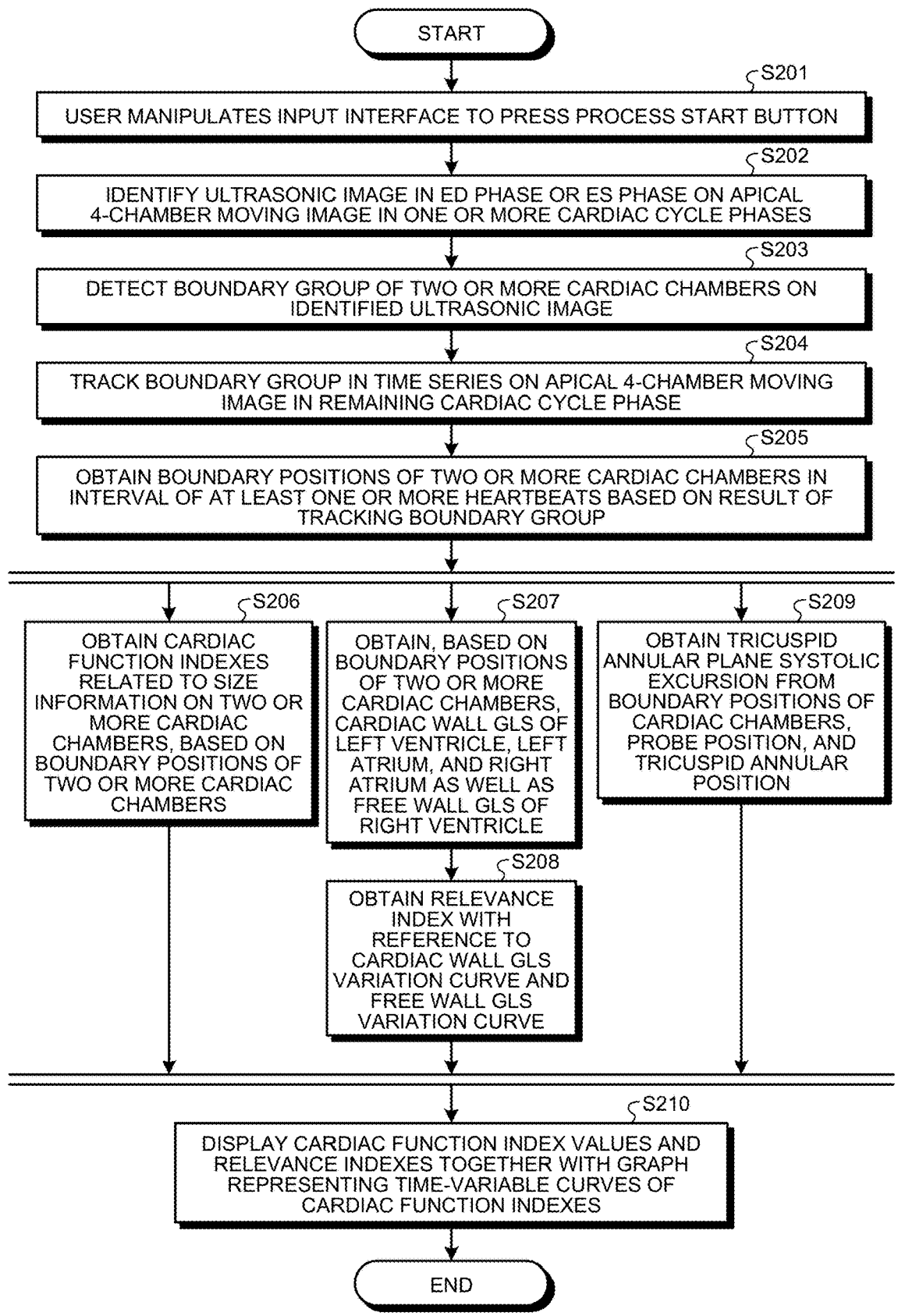
FIG. 2 is a flowchart illustrating an exemplary index obtaining process in the first embodiment.

The following will describe the index obtaining process with reference to FIG. 2. FIG. 2 illustrates a flowchart of an example of the index obtaining process.

Index Obtaining Process

Step S201

The input interface 13 receives a designation of start of the index obtaining process. Specifically, the user manipulates the input interface 13 to press an execution button for the index obtaining process.

Step S202

In response to the designation of start of the index obtaining process, the boundary detection function 371 reads an apical 4-chamber moving image in one or more heartbeats from the memory 33. The boundary detection function 371 identifies an ultrasonic image in ED phase or in ES phase on the read apical 4-chamber moving image, with reference to an electrocardiogram associated with the apical 4-chamber moving image.

Step S203

The boundary detection function 371 uses, for example, a trained learning model having learned a segmentation or a region detection to detect presence or absence of the four cardiac chambers on the identified ultrasonic image (initial boundary image). Thereby, the boundary detection function 371 defines statuses, detected and undetected with respect to the cardiac chambers on the initial boundary image. As a typical example of a display of the cardiac function indexes (see FIG. 3), the display 15 displays checkboxes for the four cardiac chambers in a checked (detected) or grayed-down (undetected) state. The boundary detection function 371 detects a boundary group from the initial boundary image with reference to a knowledge-based dictionary.

Step S204

The tracking function 373 tracks, by 2DST, the boundary group between or among two or more cardiac chambers from the ED phase in time series on the apical 4-chamber moving image in the remaining cardiac cycle phase different from that of the initial boundary image.

Step S205

The boundary-position obtaining function 375 obtains boundary positions of the two or more cardiac chambers in an interval of at least one or more heartbeats based on a result of tracking the boundary group. The boundary-position obtaining function 375 obtains the boundary positions of the two or more cardiac chambers, for example, in one heartbeat interval indicated by the R-R interval on the electrocardiogram.

Step S206

The index obtaining function 377 obtains the cardiac function indexes related to the size information on the two or more cardiac chambers, based on the boundary positions of the two or more cardiac chambers. Specifically, the index obtaining function 377 concurrently obtains cavity volumes (cavity-volume variation curves) and ejection and emptying fractions of the left ventricle, the left atrium, and the right atrium (LVEF, LAEF, RAEF) in time series based on the boundary positions among the left ventricle, the left atrium, and the right atrium. The index obtaining function 377 obtains a cavity area (cavity-area variation curve) and a right ventricular fractional area change (RVFAC) in time series based on the boundary position of the right ventricle.

The index obtaining function 377 further obtains LAVI from the boundary position of the left atrium, a maximum volume in the cavity volume variation curve of the left atrium, and the body surface area of the subject P. The index obtaining function 377 obtains RAVI from the boundary position of the right atrium, the maximum volume in the cavity volume variation curve of the right atrium, and the body surface area of the subject P. If registered patient information does not include the height and weight of the subject P, the index obtaining function 377 obtains LAV and RAV instead.

Step S207

The index obtaining function 377 obtains, based on the boundary positions of the two or more cardiac chambers, a cardiac wall GLS (cardiac wall GLS variation curve) of the left ventricle, the left atrium, and the right atrium in time series as well as a free wall GLS (free wall GLS variation curve) of the right ventricle in time series. For instance, the index obtaining function 377 obtains LVGLS from the LV circumference in the phase of a peak value of the cardiac wall GLS variation curve of the left ventricle and the LV circumference in the ED phase. The index obtaining function 377 further obtains RVFWSL from an RV free wall length in the phase of a peak value of the free wall GLS variation curve of the right ventricle, and an RV free wall length in the ED phase. The index obtaining function 377 obtains LASr from the LA circumference in the phase of a peak value of the cardiac wall GLS variation curve of the left atrium and the LA circumference in the ED phase. The index obtaining function 377 obtains RASr from the RA circumference in the phase of a peak value of the cardiac wall GLS variation curve of the right atrium and the RA circumference in the ED phase.

Step S208

The index obtaining function 377 obtains a relevance index with reference to the cardiac wall GLS variation curves and the free wall GLS variation curve. Specifically, the index obtaining function 377 obtains the phases of peak values (peak time) of the cardiac wall GLS variation curves and the free wall GLS variation curve. The index obtaining function 377 then finds a peak-time difference dt_LV-RV between the peak time of the left ventricle and the peak time of the right ventricle. The index obtaining function 377 also finds a peak-time difference dt_LV-LA between the peak time of the left ventricle and the peak time of the left atrium. The index obtaining function 377 finds a maximum peak-time difference max-dt between a minimum peak time and a maximum peak time of the four cardiac chambers.

Further, the index obtaining function 377 subtracts RVFWSL from LVGLS to find a peak-value difference dp_GLS_LV-RV. The index obtaining function 377 subtracts LASr from LVGLS to find a peak-value difference dp_GLS_LV-LA. The index obtaining function 377 then finds a ratio of the peak-value differences Rdp_GLS_LV-RV from LVGLS and RVFWSL. The index obtaining function 377 also finds a ratio of the peak-value differences Rdp_GLS_LV-LA from LVGLS and LASr. Additionally, the index obtaining function 377 may find a mean value of the peak-time differences among the maximum four cardiac chambers and a standard deviation from the mean value and the maximum four peak-time differences.

Step S209

The index obtaining function 377 identifies tricuspid annular positions on the free wall side in time series based on the boundary positions of the two or more cardiac chambers obtained by the boundary-position obtaining function 375. The index obtaining function 377 then identifies a maximum distance of the distances D(t) between probe positions (Dap(t)) and tricuspid annular positions (Dtv(t)) on the free wall side in a single heartbeat, for example. The index obtaining function 377 subtracts the maximum value D(t) in the single heartbeat from the distance D(ED) in the ED phase to find a tricuspid annular plane systolic excursion (TAPSE).

Step S210

The display 15 displays at least one or more of the cardiac function indexes obtained by the index obtaining function 377. The display 15 displays the cardiac function indexes for the two or more cardiac chambers concurrently. Specifically, the display 15 concurrently displays the cardiac function index values and relevance indexes at the same time, together with a graph representing the time-variable curves of the cardiac function indexes. Of the apical 4-chamber moving image, the cardiac chambers whose boundary positions have been automatically detected are displayed on the display 15. As an example, the display 15 displays checked (detected) or grayed-down (undetected) checkboxes for the respective cardiac chambers.

Figure 3:
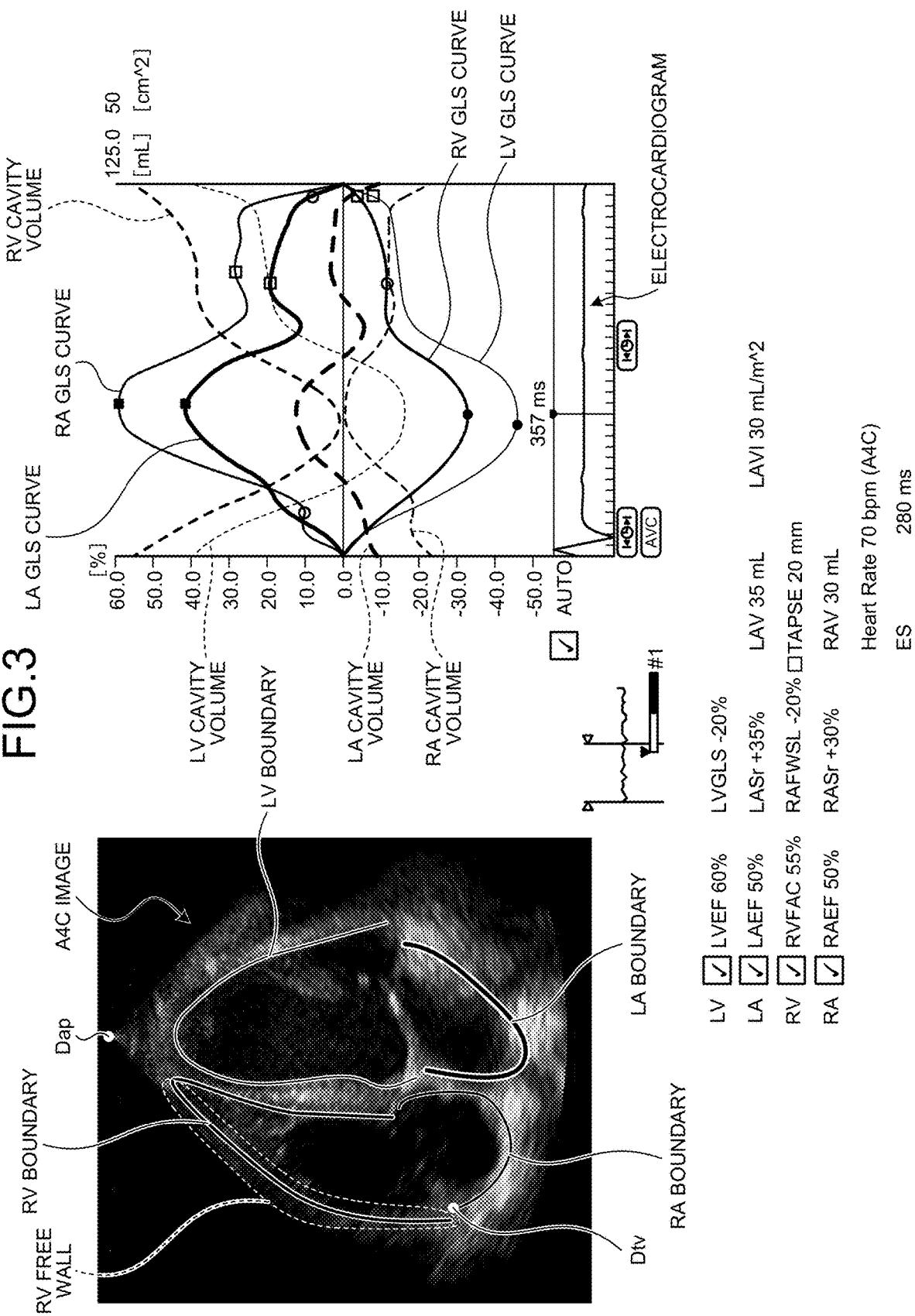
FIG. 3 illustrates an exemplary display of time-variable curves of cardiac function indexes including size information and GLS together with an A4C image depicting each cardiac chamber as a region of interest with indication of a group of cardiac cavity positions in the first embodiment.

FIG. 3 illustrates an exemplary display on the display 15, showing time-variable curves of cardiac function indexes including size information and GLS together with an apical 4-chamber (A4C) view image depicting the respective cardiac chambers as a region of interest with indication of positions of cardiac cavities. As illustrated in FIG. 3, the display 15 further displays a list of the typical cardiac function indexes as described above. It is preferable to additionally display a heart rate [bpm] and an ES time [msec] which are found from one cardiac cycle period in the apical 4-chamber moving image. Herein, the ES time is set to the time phase of the left ventricle with a minimum cavity volume (i.e., time at which a minimum LV volume is obtained). Alternatively, an aortic valve closure (AVC) time may be separately measured and inputted for use.

As illustrated in FIG. 3, the time-variable curves indicated by the solid lines represent GLS information and the ones indicated by the broken lines represent size information. Maximum eight graphs along the same time axis are displayed on the display 15. If there is difficulty in viewing too many graphs on the display, the user may give an instruction to clear the check marks in the checkboxes for intended cardiac chambers via the input interface 13, so that the graphs disappear from the display 15. This can implement a display/non-display control over any intended graph or graphs. In addition a region of interest and its corresponding graph can be displayed in the same color, e.g., LV: yellow, RV: blue, LA: pink, and RA: green. This is suitable in terms of assisting the user to understand their associations. Further, as illustrated in FIG. 3, the GLS time-variable curves may be shown with marks indicating peak positions. Relevant information may also be displayed on the display of FIG. 3 when appropriate.

As illustrated in FIG. 3, the box-shaped mark next to TAPSE is a checkbox for selecting display or non-display of a waveform of the distance D(t) found for obtaining TAPSE. When a check is put in the TAPSE checkbox by a user's instruction via the input interface 13, a D(t) waveform is displayed in a different color (e.g., white) in a superimposed manner on the graph of FIG. 3. A scale indicating the length (mm) of the distance D(t) is additionally displayed on the display next to the right-side vertical axis of the graph. Alternatively, when a check is put in the TAPSE checkbox by a user's instruction via the input interface 13, the D(t) waveform may be displayed as a broken-line time-variable curve in place of the broken-line time-variable curve representing an RV cavity area (t). In this case the scale representing area (cm2) next to the right-side vertical axis of the graph in FIG. 3 disappears and a scale indicating the length (mm) of the distance D(t) is displayed on the display instead.

According to the first embodiment as described above, the ultrasound diagnostic apparatus 1 concurrently obtains two or more cardiac function indexes for at least two or more cardiac chambers including the left ventricle and the right ventricle among cardiac chambers appearing on the apical 4-chamber moving image of the subject P during one or more heartbeats, based on the boundary positions of the cardiac chambers appearing on the apical 4-chamber moving image, and displays at least one or more of the two or more cardiac function indexes. As an example, the ultrasound diagnostic apparatus 1 automatically detects a boundary group indicating boundary positions of the cardiac chambers in at least one or more cardiac cycle phases from the apical 4-chamber moving image being an ultrasonic moving image, and tracks the boundary group in time series in the apical 4-chamber moving image in the remaining cardiac cycle phase different from a cardiac cycle phase at the time of the automatic detection of the boundary group. By this tracking, the ultrasound diagnostic apparatus 1 obtains the boundary positions of the cardiac chambers during an interval of at least one or more heartbeats. Thus, the ultrasound diagnostic apparatus 1 concurrently obtains two or more cardiac function indexes for the four cardiac chambers appearing on the apical 4-chamber moving image. In addition the ultrasound diagnostic apparatus 1 displays two or more cardiac function indexes for two or more cardiac chambers at the same time. The ultrasound diagnostic apparatus 1 displays the cardiac chambers whose boundary positions have been automatically detected in the apical 4-chamber moving image.

Further, according to the first embodiment the cardiac function indexes include cavity volume and fractional volume change with respect to the left ventricle, the left atrium, and the right atrium, and cavity area and fractional area change with respect to the right ventricle. According to the first embodiment the cardiac function indexes further include cardiac wall GLS for the left ventricle, the left atrium, and the right atrium, and free wall GLS for the right ventricle, among the two or more cardiac chambers. Moreover, according to the first embodiment the cardiac function indexes include left atrium volume index for the left atrium and tricuspid annular plane systolic excursion for the right ventricle. The ultrasound diagnostic apparatus 1 of the first embodiment obtains at least either of a peak-time difference and a peak-value difference among the cardiac function index values for two or more cardiac chambers in the same heartbeat as a relevance index indicating a cardiac function index relevant to the two or more cardiac chambers.

As obvious from the above, according to the present embodiment it is made possible for the user to know the relevance between the left and right sides of the heart and among the cardiac chambers from the concurrently obtained cardiac function indexes for the two or more chambers, using a low-cost apparatus including no 2D array or 3D data acquisition structure by a simple one-touch operation to start a series of processing. Herein, the term "relevance" refers to a relationship or connection proved by assessment of the amount of a delay based on the peak timing of the cardiac function index and/or assessment of peak-value comparison. That is, as to the time-variable curves of the size information on different cardiac chambers and the GLS time-variable curves, a difference dt [msec] in peak time, a difference dp [%] in peak value, and a ratio Rdp [%] of differences in peak value are given as a secondary, i.e., relevant, wall motion index (i.e., information on difference in wall motion index between or among two or more cardiac chambers). In biventricular pacing therapy, for example, the relevance information obtained by the present embodiment can be used in assessment of the relevance with respect to a level of asynchronous myocardial contraction before and after the therapy. This makes it possible to know a degree of difference in peak timing between both ventricles and a degree of difference in peak timing between the left ventricle and the left atrium at the same time in the present embodiment.

Owing to the features as above, the ultrasound diagnostic apparatus 1 of the present embodiment can simply, easily, and at lower cost obtain the cardiac function indexes and the relevance information for display, to thereby allow understanding of the relevance concerning cardiac function assessments at the same time. Thus, the ultrasound diagnostic apparatus 1 can provide improved operability for the obtainment of the cardiac function indexes and improved throughput for cardiac function diagnosis.

First Modification

The first embodiment has described an example that the boundary detection function 371, the tracking function 373, the boundary-position obtaining function 375, and the index obtaining function 377 define the cardiac function indexes in all the phases of one cardiac cycle of the subject P. In a first modification, however, the cardiac function indexes are defined without use of the tracking function 373 such that the boundary detection function 371 automatically detects a boundary group in two cardiac cycle phases as ED phase and ES phase to allow for defining the cardiac function indexes based on the detected boundary group. In the first modification the time-variable curves as output of the index obtaining function 377 cannot be obtained, however, it is possible to display a list of typical cardiac function indexes as defined as below. Although not illustrated in the figures, in place of the time-variable curves on the right side of FIG. 3, a list of typical cardiac function indexes is displayed along with an A4C image showing respective cardiac chambers in ES phase as a region of interest with indication of positions of cardiac cavities. According to the first modification, it is thus preferable to display the following list of typical cardiac function indexes and an A4C image together on the display 15. In this case the A4C image on the left side is a moving image or shows the ED phase.

For the purpose of clarifying the differences from the first embodiment, in the following definitions, cardiac function indexes are denoted by codes with a prime mark (').

$$LVEF'=100*(LVED\ volume-LVES\ volume)/LVED\ volume\ [\%]$$

$$LAEF'=100*(LAES\ volume-LAED\ volume)/LAES\ volume\ [\%]$$

$$RAEF'=100*(RAES\ volume-RAED\ volume)/RAES\ volume\ [\%]$$

$$RVFAC'=100*(RVED\ cavity\ area-RVES\ cavity\ area)/RVED\ cavity\ area\ [\%]$$

$$LVGLS'=100*(LV\ circumference\ (ES)-LV\ circumference\ (ED))/LV\ circumference\ (ED)\ [\%]$$

$$RVFWSL'=100*(RV\ free\ wall\ length\ (ES)-RV\ free\ wall\ length(ED))/RV\ free\ wall\ length\ (ED)\ [\%]$$

$$LASr'=100*(LA\ circumference\ (ES)-LA\ circumference\ (ED))/LA\ circumference\ (ED)\ [\%]$$

$$RASr'=100*(RA\ circumference\ (ES)-RA\ circumference\ (ED))/RA\ circumference\ (ED)\ [\%]$$

$$LAVI'=LAESV/body\ surface\ area\ [mL/m2]\ where\ LAESV=LAES\ volume\ [mL]$$

$$RAVI'=RAESV/body\ surface\ area\ [mL/m2]\ where\ RAESV=RAES\ volume\ [m]$$

$$TAPSE'=D(ED)-D(ES)[mm]\ where\ D(t)=|Dap(t)-Dtv(t)|\ mm]$$

In the first modification the index obtaining process omits step S204 shown in FIG. 2. In step S205 boundary positions of two or more cardiac chambers in ED phase and ES phase are obtained. Further, in step S206 to step S209 size information and strain index values are obtained from the boundary positions of the two or more cardiac chambers in ED phase and ES phase to find cardiac function indexes and relevance indexes.

The ultrasound diagnostic apparatus 1 of the first modification can obtain the cardiac function indexes and relevance indexes based on the boundary positions of two or more cardiac chambers in ED phase and ES phase, without execution of the tracking function 373. This enables a reduction in computational cost such as a computation time taken for obtaining the cardiac function indexes and the relevance indexes, resulting in further improving the throughput for cardiac function diagnosis. The rest of the effects of the first modification is the same or similar as those of the first embodiment, therefore, an explanation thereof is omitted.

Second Modification

In a second modification the time-variable curves output from the index obtaining function 377 are separately displayed on the display 15 for each of the cardiac chambers along the same time axis. Specifically, the cardiac function indexes output from the index obtaining function 377 are in the form of a graph representing a time-variable curve of the cardiac function index concerned. The display 15 displays two or more graphs in the same time axis size for two or more cardiac chambers to be displayed.

Figure 4:
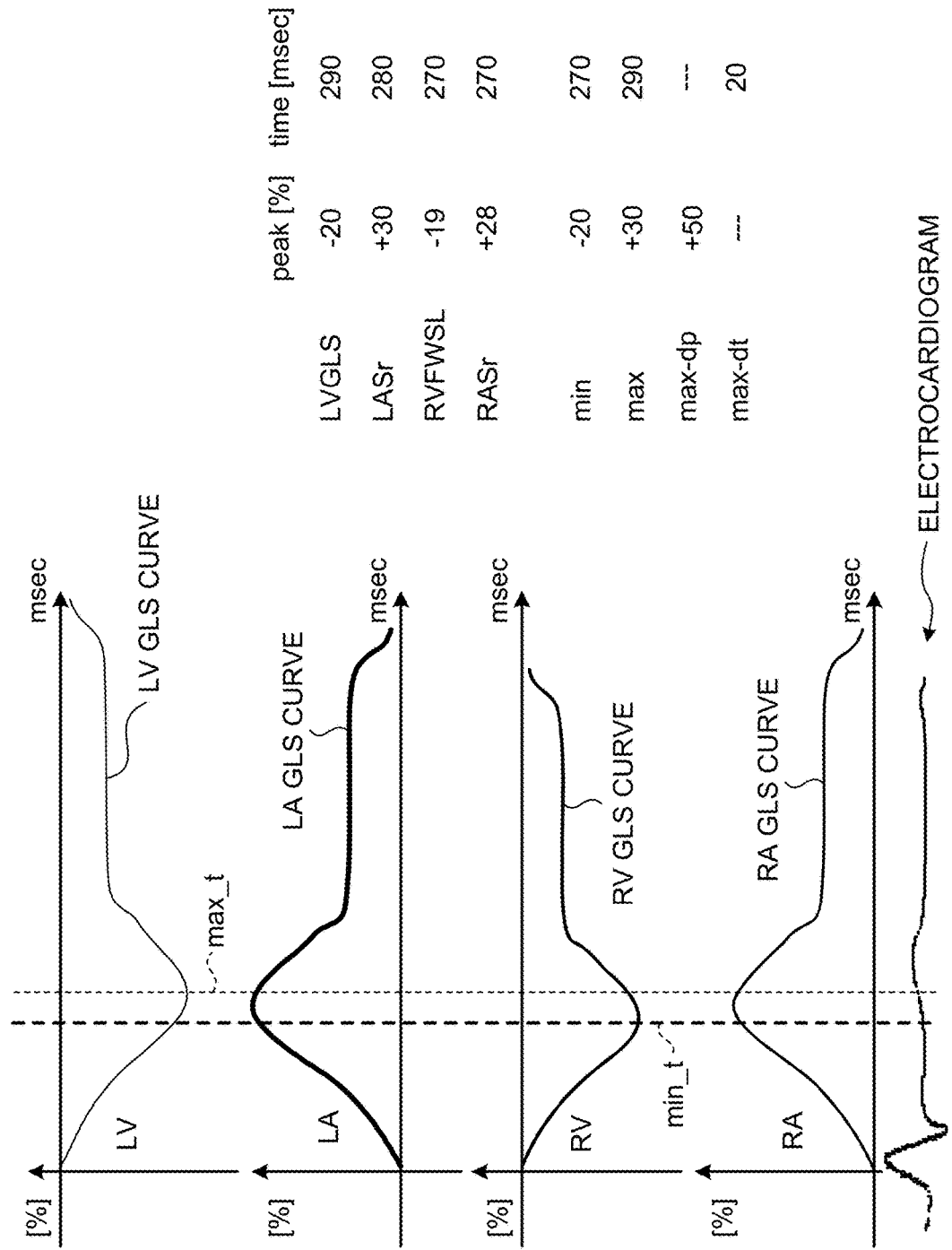
FIG. 4 illustrates an exemplary display of GLS curves alone as time-variable curves according to a second modification of the first embodiment.

FIG. 4 illustrates GLS curves alone as time-variable curves by way of example. FIG. 4 also illustrates an exemplary display of a maximum peak-time difference max–dt (20 msec in the drawing) and a maximum peak-value difference max–dp (+50% in the drawing) among detected cardiac chambers, together with the GLS curves. In the table shown in FIG. 4 a maximum value between the cardiac chambers is represented by max and a minimum value is represented by min. Thus, the value of max–min of peak times corresponds to max–dp, and the value of max–min of peak values corresponds to max–dt. Although only the GLS curves are displayed as time-variable curves in FIG. 4, the display 15 may display time-variable curves (size curves) of size information (such as cavity volume, cavity area) of the respective cardiac chambers, or display GLS curves and size curves of the respective cardiac chambers together.

According to the ultrasound diagnostic apparatus 1 of the second modification, the cardiac function indexes output from the index obtaining function 377 are in the form of a graph representing a time-variable curve of the cardiac function index concerned, and two or more graphs for two or more cardiac chambers to be displayed (detected) are displayed in the same time axis size. Thereby, the ultrasound diagnostic apparatus 1 can display, e.g., maximum eight graphs in a less superimposed manner, which makes it possible to provide the user with enhanced viewability with respect to the graphs. According to the second modification, thus, it is made possible to further improve the throughput for cardiac function diagnosis. The rest of the effects of the second modification is the same or similar as those of the first embodiment, therefore, an explanation thereof is omitted.

Third Modification

When a single heartbeat is set to a time domain of definition as described in the first embodiment, the size curves and GLS curves are displayed in the form of a graph as illustrated in FIG. 3 of the first embodiment and FIG. 4 of the second modification. In this case the state of cardiac contractions as represented by PQRS in the electrocardiogram appears on the graphs in a horizontally divided manner. In this regard, in the third modification the time domain of definition is set to at least two or more heartbeats. In other words, the apical 4-chamber moving image used in the index obtaining process of this modification is equivalent to an ultrasonic moving image acquired during two or more heartbeats. Thus, the index obtaining function 377 outputs a graph representing time-variable curves of the cardiac function indexes in at least two or more cardiac cycles. That is, in the third modification the display 15 displays graph outputs in two or more cardiac cycles when two or more cardiac chambers to be displayed include a ventricle and an atrium, for example.

Figure 5:
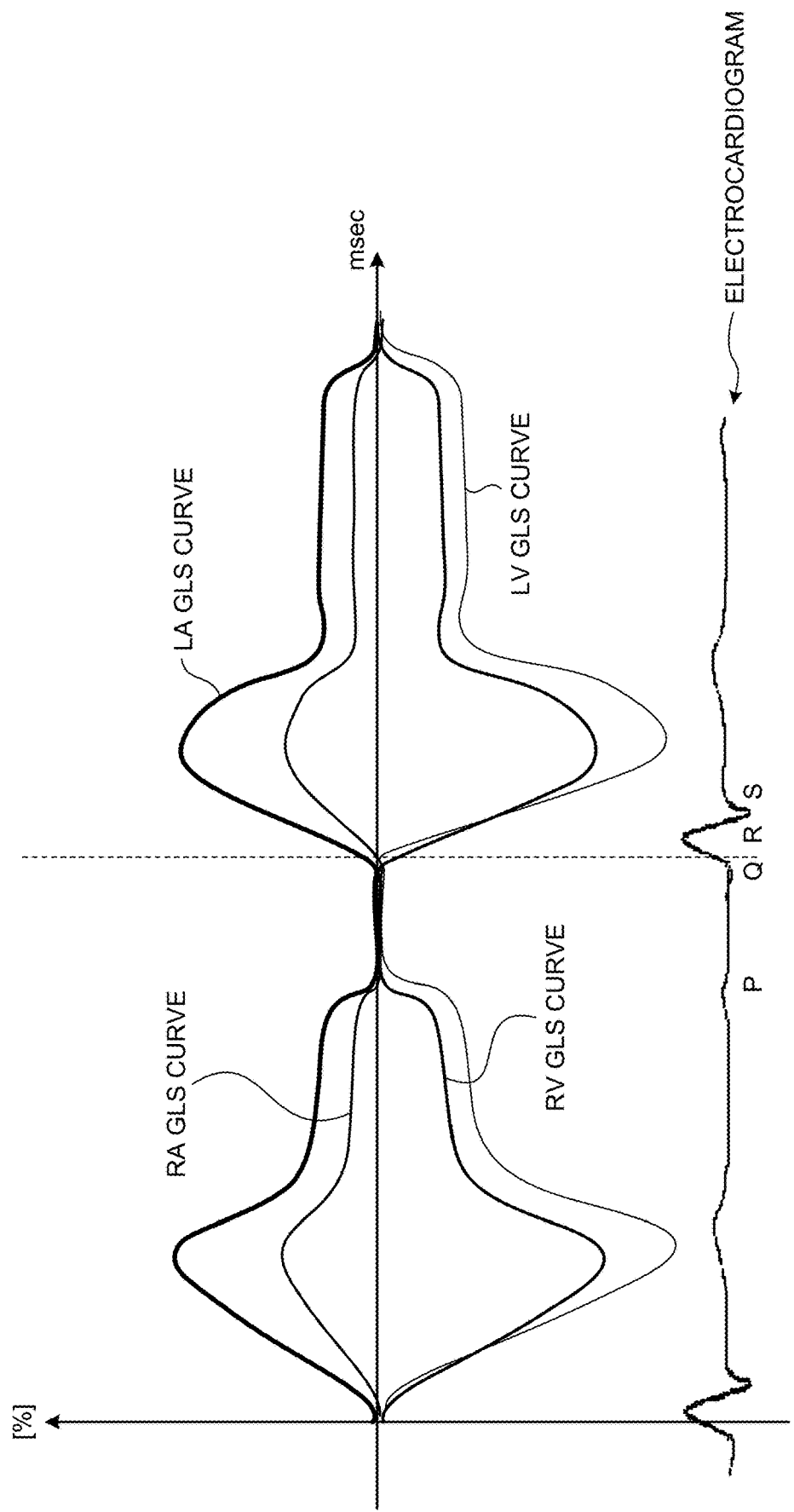
FIG. 5 illustrates an exemplary display in a third modification of the first embodiment.

FIG. 5 illustrates an exemplary display in this modification. As in the first embodiment, FIG. 5 illustrates an example that a graph of a superimposed form for two or more cardiac chambers is on display, showing GLS curves alone as time-variable curves, and the time domain of definition is set to two heartbeats. Alternatively, as an exemplary application of this modification although not illustrated in the figures, the graph for two or more cardiac chambers may be of a divided form as in the second modification, and the time domain of definition may be set to two or more heartbeats.

According to the ultrasound diagnostic apparatus 1 of the third modification, the cardiac function indexes output from the index obtaining function 377 are in the form of a graph representing a time-variable curve of the cardiac function index concerned, and the graph output in two or more cardiac cycles is displayed when two or more cardiac chambers to be displayed (detected) include a ventricle and an atrium. Thereby, with respect to the atria which start contracting with reference to the P-wave and the ventricles which start contracting with reference to the R-wave, the ultrasound diagnostic apparatus 1 of the third modification can provide a continuous graph display representing a series of contractions represented as PQRS in the same heartbeat. According to the third modification, it is thus made possible to further improve the throughput for cardiac function diagnosis. The rest of effects of the third modification is the same or similar as those of the first embodiment, therefore, an explanation thereof is omitted.

Fourth Modification

In a fourth modification the secondary index (relevance index) values indicating the relevance among the cardiac chambers are averaged among the heartbeats to provide stable outputs. For example, considering a case such as atrial fibrillation that averaging of measurements in two or more heartbeats is recommended, this modification gains greater importance. This modification describes an ultrasound diagnostic apparatus disclosed in JP 2008-302920 (A) that implements 2DST in real time and performs basic operations in the index obtaining process of the first embodiment, by way of example. The index obtaining function 377 outputs a mean value of relevance index values during two or more heartbeats, based on boundary positions in an apical 4-chamber moving image captured in real time.

As an example, in response to an execute button for the index obtaining process being pressed during ultrasonic scanning of the subject P, the boundary detection function 371 detects boundary positions of two or more cardiac chambers on the ultrasonic image displayed on the display 15. The index obtaining function 377 then obtains cardiac function indexes based on the detected boundary positions. The display 15 displays the cardiac function indexes in real time. The tracking function 373 tracks the boundary positions in a next frame of the ultrasonic image captured after the one from which the boundary positions have been detected. The index obtaining function 377 then obtains cardiac function indexes based on the tracked boundary positions and the display 15 displays the cardiac function indexes in real time. The above processing is performed in one heartbeat, and the boundary-position obtaining function 375 obtains boundary positions in the one heartbeat based on a result of the tracking by the tracking function 373. The index obtaining function 377 then obtains relevance indexes based on the boundary positions. The display 15 displays the relevance indexes in real time.

Further, based on the boundary positions in the apical 4-chamber moving image captured in real time, the index obtaining function 377 outputs a mean value of the relevance index values in two or more heartbeats. Specifically, the index obtaining function 377 obtains secondary index values (e.g., dt_LV–LA) indicating relevance between the cardiac chambers in each heartbeat. The index obtaining function 377 then averages the secondary index values in a given heartbeat period (for example, ten heartbeats) for output. Thereby, a mean value of the secondary index values (mean excursion value) in a given, previous heartbeat period is output in real time upon every heartbeat. In response to an output of a new mean excursion value, the display 15 updates the mean excursion value on display to the new mean excursion value, for example.

The ultrasound diagnostic apparatus 1 of this modification outputs a mean value of relevance index values in two or more heartbeats for display, based on boundary positions in an apical 4-chamber moving image captured in real time. The ultrasound diagnostic apparatus 1 enables the user to know the cardiac function indexes and the relevance indexes with respect to the subject P in real time by a simple operation. For example, in a case such as atrial fibrillation that averaging of measurements during two or more heartbeats is recommended, the ultrasound diagnostic apparatus 1 can improve the throughput for cardiac function assessment and/or diagnosis of the subject P. The rest of the effects of the fourth modification is the same or similar as those of the first embodiment, therefore, an explanation thereof is omitted.

As an exemplary application of the first embodiment, the A4C moving image used in the index obtaining process may be either an image captured with a transthoracic echocardiography (TTE) probe or an image captured with a transesophageal echocardiography (TEE) probe. Also, the first embodiment can be combined with an apparatus capable of real-time 3D scanning to obtain volume data by electronic scanning using a two-dimensional array probe. In this case, the first embodiment is applicable to not only A4C moving images captured by 2D scanning but also A4C moving images extracted from moving volume data including the heart by multi-planar reconstruction (MPR). In this regard the image generator circuitry 29 detects an A4C view (apical 4-chamber view) in moving volume data and extracts a multi-planar reconstructed moving image of the detected apical 4-chamber view from the moving volume data, as an example. The extracted apical 4-chamber moving image is a multi-planar reconstructed image extracted from the moving volume data including the heart of the subject P. The basic idea of the first embodiment is expandable to cover such MPR A4C moving images as inputs. It should be thus understood that the first embodiment can attain the effects that enable the user to know the relevance between the left and right sides of the heart and/or among the cardiac chambers by a simple one-touch operation to initiate a series of processing.

Second Embodiment

Differences between a second embodiment and the first embodiment are in that a medical image analytic apparatus performs the index obtaining process of the first embodiment. The medical image analytic apparatus is, for example, implemented by a server device connected to a modality via a network. Various functions to be executed by the medical image analytic apparatus may be implemented by various kinds of in-hospital servers such as a picture archiving and communication systems (PACS) server.

Figure 6:
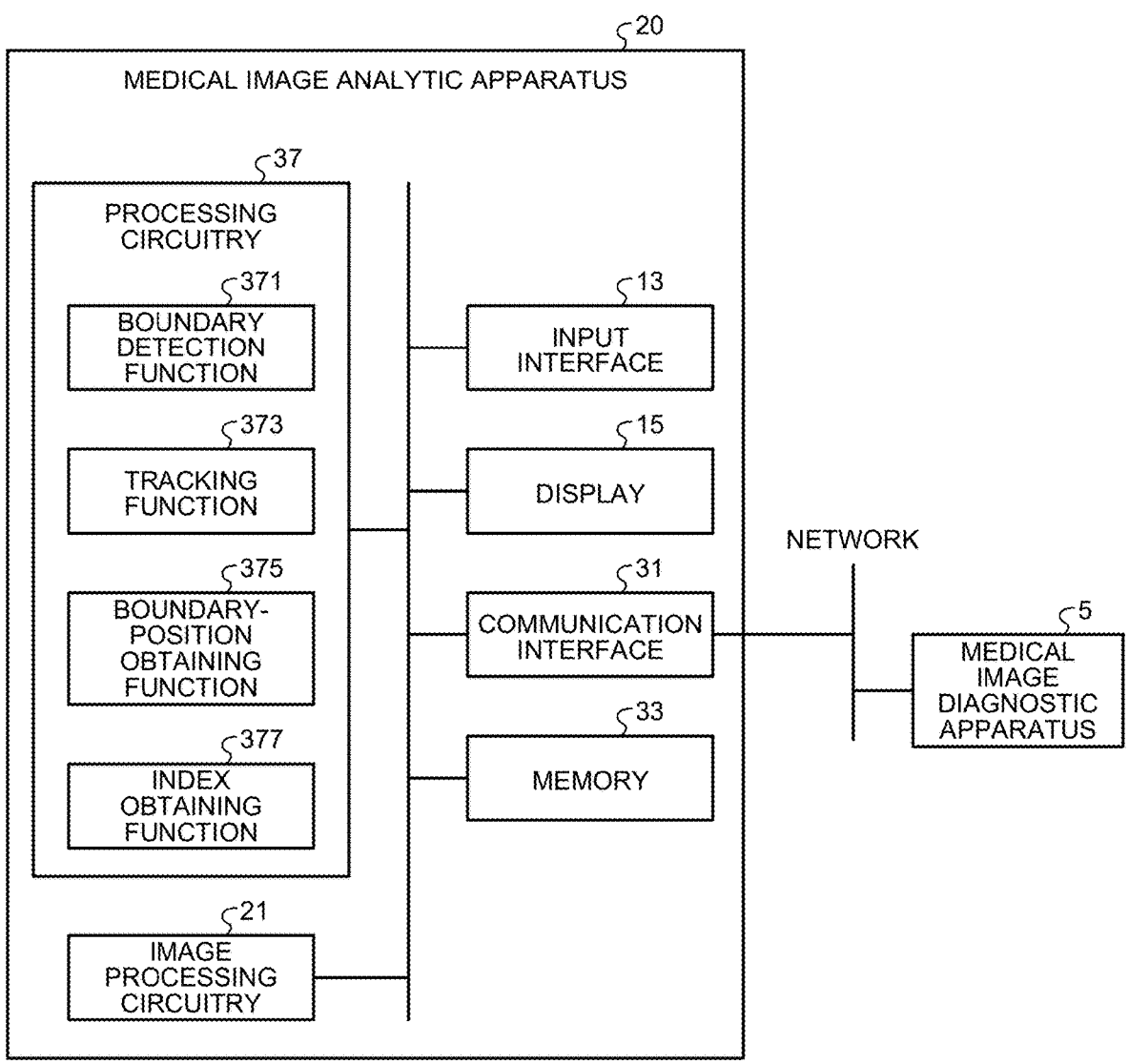
FIG. 6 illustrates an exemplary structure of a medical image analytic apparatus according to a second embodiment.

FIG. 6 shows an exemplary structure of a medical image analytic apparatus 20. The medical image analytic apparatus 20 includes an index obtaining function (index obtainer unit) 377 and a display (display unit) 15. The index obtaining function 377 serves to concurrently obtain two or more cardiac function indexes for at least two or more cardiac chambers including the left ventricle and the right ventricle among cardiac chambers appearing on the apical 4-chamber moving image of the subject P during one more heartbeats, based on the boundary positions of the cardiac chambers appearing on the apical 4-chamber moving image. The display 15 displays at least one or more of the cardiac function indexes.

In the index obtaining process of the medical image analytic apparatus 20, the apical 4-chamber moving image to be analyzed is exemplified by an ultrasonic moving image or a cine magnetic resonance moving image. In the case of the apical 4-chamber moving image being an ultrasonic moving image, a medical image diagnostic apparatus 5 corresponds to a traditional ultrasound diagnostic apparatus. In this case a communication interface 31 receives the apical 4-chamber moving image from the traditional ultrasound diagnostic apparatus and outputs it to processing circuitry 37. In the case of the apical 4-chamber moving image being a cine magnetic resonance moving image, the medical image diagnostic apparatus 5 corresponds to a traditional magnetic resonance imaging apparatus. In this case the communication interface 31 receives the apical 4-chamber moving image from the traditional magnetic resonance imaging apparatus and outputs it to the processing circuitry 37.

When receiving the apical 4-chamber moving image being volume data from the medical image diagnostic apparatus 5, image processing circuitry 21 detects an apical 4-chamber view from the volume data through known region detection processing. The image processing circuitry 21 then performs MPR processing to the volume data and the detected apical 4-chamber view to generate a two-dimensional apical 4-chamber moving image (MPR moving image) of the apical 4-chamber view. The image processing circuitry 21 outputs the two-dimensional apical 4-chamber moving image to the processing circuitry 37.

The index obtaining process of the second embodiment has similar or same procedures and effects as that of the first embodiment, therefore, a description thereof is omitted. Various kinds of functions performed in the medical image analyzing layer may be incorporated in the magnetic resonance imaging apparatus. As a modification of the second embodiment, the medical image analytic apparatus 20 may be implemented by a workstation or cloud computing. In such a case an input interface 13 and the display 15 may work as a client server and be connected to the network. In addition the communication interface 31, the memory 33, and the processing circuitry 37 may be incorporated in a server on the network.

To implement the technical ideas presented in the various embodiments and modifications by a medical image analysis program, the medical image analysis program causes a computer to concurrently obtain two or more cardiac function indexes for at least two or more cardiac chambers including the left ventricle and the right ventricle among cardiac chambers appearing on an apical 4-chamber moving image of a subject P during one or more heartbeats, based on boundary positions of the cardiac chambers appearing on the apical 4-chamber moving image, and causes the display 15 to display at least one or more of the cardiac function indexes. As an example, the medical image analysis program can be installed on a computer included in a PACS server, an integrated server, or the ultrasound diagnostic apparatus 1 in an in-hospital information system, and be loaded on the memory to implement the index obtaining process. In this case the program that causes the computer to such processing can be stored and distributed in a storage medium such as a magnetic disk (as a hard disk), an optical disc (CD-ROM, DVD, etc.), and a semiconductor memory. The procedures and effects of the medical image analysis program are similar or same as those of the embodiments, therefore, a description thereof is omitted.

At least one of the embodiments and modifications makes it possible for the user to know the relevance between the left and right sides of the heart and/or among the cardiac chambers by a simple operation using an inexpensive apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

With respect to the embodiments and modifications as above, the following subjoinders describing an aspect and selective features of the present invention will be presented.

Subjoinder 1:

An ultrasound diagnostic apparatus includes an index obtainer unit configured to concurrently obtain a plurality of cardiac function indexes for at least two or more cardiac chambers including a left ventricle and a right ventricle among cardiac chambers appearing on an apical 4-chamber moving image of a subject during one or more heartbeats, based on boundary positions of the cardiac chambers appearing on the apical 4-chamber moving image; and a display unit that displays at least one or more of the plurality of cardiac function indexes.

Subjoinder 2:

The index obtainer unit may concurrently obtain the plurality of cardiac function indexes for four cardiac chambers appearing on the apical 4-chamber moving image.

Subjoinder 3:

The display unit may concurrently display the plurality of cardiac function indexes for the cardiac chambers.

Subjoinder 4:

The apical 4-chamber moving image may be an ultrasonic moving image.

Subjoinder 5:

The ultrasound diagnostic apparatus may further include a boundary detector unit configured to automatically detect, from the apical 4-chamber moving image, a boundary group representing the boundary positions of the cardiac chambers in at least one or more cardiac cycle phases; a tracking unit configured to track the boundary group in the apical 4-chamber moving image in a remaining cardiac cycle phase different from a cardiac cycle phase in which the boundary group has been automatically detected; and a boundary-position obtainer unit configured to obtain the boundary positions of the cardiac chambers in an interval of at least the one or more heartbeats by tracking the boundary group.

Subjoinder 6:

The cardiac function indexes for a left ventricle, a left atrium, and a right atrium may include cavity volume and fractional volume change. The cardiac function indexes for a right ventricle may include cavity area and fractional area change.

Subjoinder 7:

The cardiac function indexes for a left ventricle, a left atrium, and a right atrium among the cardiac chambers may include cardiac wall global longitudinal strain (GLS). The cardiac function indexes for a right ventricle among the cardiac chambers may include free wall GLS.

Subjoinder 8:

The cardiac function indexes for the left atrium may include left atrium volume index. The cardiac function indexes for the right ventricle may include tricuspid annular plane systolic excursion.

Subjoinder 9:

The display unit may display cardiac chambers whose boundary positions have been automatically detected in the apical 4-chamber moving image.

Subjoinder 10:

An output of each of the plurality of cardiac function indexes may be in the form of a graph representing a time-variable curve of the cardiac function index. The display unit may display two or more graphs for the cardiac chambers to be displayed in a same time axis size.

Subjoinder 11:

An output of each of the plurality of cardiac function indexes may be in the form of a graph representing a time-variable curve of the cardiac function index. The display unit may display a graph output in two or more cardiac cycles when the cardiac chambers to be displayed include a ventricle and an atrium.

Subjoinder 12:

The index obtainer unit may be further configured to obtain at least one of a peak-time difference and a peak-value difference in index values representing cardiac functions of the cardiac chambers in a same heartbeat, as a relevance index indicating a cardiac function index relevant to the cardiac chambers.

Subjoinder 13:

The index obtainer unit may be further configured to output a mean value of the relevance index in two or more heartbeats based on the boundary positions in the apical 4-chamber moving image captured in real time.

Subjoinder 14:

The apical 4-chamber moving image may be a multi-planar reconstructed moving image extracted from moving volume data including the heart of the subject.

Subjoinder 15:

A medical image analytic apparatus include an index obtainer unit configured to concurrently obtain a plurality of cardiac function indexes for at least two or more cardiac chambers including a left ventricle and a right ventricle among cardiac chambers appearing on an apical 4-chamber moving image of a subject during one or more heartbeats, based on boundary positions of the cardiac chambers appearing on the apical 4-chamber moving image; and a display unit that displays at least one or more of the plurality of cardiac function indexes.

Subjoinder 16:

The apical 4-chamber moving image may be an ultrasonic moving image or a cine magnetic resonance moving image.

Subjoinder 17:

A medical image analysis program causes a computer to execute concurrently obtaining a plurality of cardiac function indexes for at least two or more cardiac chambers including a left ventricle and a right ventricle among cardiac chambers appearing on an apical 4-chamber moving image of a subject during one or more heartbeats, based on boundary positions of the cardiac chambers appearing on the apical 4-chamber moving image; and displaying at least one or more of the plurality of cardiac function indexes on a display.

What is claimed is:

1. An ultrasound diagnostic apparatus, comprising:
an ultrasound probe configured to transmit an ultrasonic wave to a subject and receive the ultrasonic wave reflected;
processing circuitry configured to obtain information indicative of a plurality of cardiac function indexes for at least two or more of a left ventricle, a right ventricle, a left atrium, and a right atrium from an apical 4-chamber moving image of the subject for one or more heartbeats acquired based on a signal from the ultrasound probe; and
a display that displays the information indicative of the plurality of cardiac function indexes,
wherein the processing circuitry is further configured to:
automatically detect, from the apical 4-chamber moving image, a boundary group representing boundary positions of the cardiac chambers in at least one or more cardiac cycle phases,
track the boundary group in the apical 4-chamber moving image in a remaining cardiac cycle phase different from a cardiac cycle phase in which the boundary group has been automatically detected; and
obtain the boundary positions of the cardiac chambers in an interval of at least the one or more heartbeats by tracking the boundary group.

2. An ultrasound diagnostic apparatus comprising:
processing circuitry configured to concurrently obtain a plurality of cardiac function indexes for at least two or more cardiac chambers including a left ventricle and a right ventricle among cardiac chambers appearing on an apical 4-chamber moving image of a subject during one or more heartbeats, based on boundary positions of the cardiac chambers appearing on the apical 4-chamber moving image; and
a display that displays at least one or more of the plurality of cardiac function indexes, wherein
the cardiac function indexes for the left ventricle, a left atrium, and a right atrium include cavity volume and fractional volume change, and
the cardiac function indexes for the right ventricle include cavity area and fractional area change.

3. The ultrasound diagnostic apparatus according to claim 2, wherein the cardiac function indexes for the left ventricle, the left atrium, and the right atrium among the cardiac chambers include cardiac wall global longitudinal strain (GLS), and
the cardiac function indexes for the right ventricle among the cardiac chambers include free wall GLS.

4. The ultrasound diagnostic apparatus according to claim 2, wherein the cardiac function indexes for the left atrium include a left atrium volume index, and
the cardiac function indexes for the right ventricle include a tricuspid annular plane systolic excursion.

5. The ultrasound diagnostic apparatus according to claim 2, wherein an output of each cardiac function index of the plurality of cardiac function indexes is in the form of a graph representing a time-variable curve of the cardiac function index, and
the display displays a graph output in two or more cardiac cycles when the cardiac chambers to be displayed include a ventricle and an atrium.

6. The ultrasound diagnostic apparatus according to claim 2, wherein the processing circuitry is further configured to obtain at least one of a peak-time difference and a peak-value difference in index values representing cardiac functions of the cardiac chambers in a same heartbeat, as a relevance index indicating a cardiac function index relevant to the cardiac chambers.

7. The ultrasound diagnostic apparatus according to claim 6, wherein the processing circuitry is further configured to output a mean value of the relevance index in two or more heartbeats based on the boundary positions in the apical 4-chamber moving image captured in real time.

8. The ultrasound diagnostic apparatus of claim 2, wherein
the fractional volume changes for the left ventricle, the left atrium, and the right atrium include an ejection fraction change for the left ventricle and an emptying fraction change for the left atrium and the right atrium; and
the cardiac function indexes for the right ventricle include the fractional area change.

9. The ultrasound diagnostic apparatus of claim 2, wherein
the cardiac function indexes for the left ventricle, the left atrium, and the right atrium include a global longitudinal strain (GLS) of an entire cardiac wall; and
the cardiac function indexes for the right ventricle include a GLS of a free wall.

10. The ultrasound diagnostic apparatus of claim 2, wherein
the processing circuitry is further configured to obtain respective boundary positions of the at least two or more cardiac chambers in a plurality of two-dimensional ultrasound images corresponding to two or more cardiac phases included in the apical 4-chamber moving image; and
the display displays, in juxtaposition, information representing the cardiac function indexes for the at least two or more cardiac chambers, and the plurality of two-dimensional ultrasound images on which information representing the boundary positions of the at least two or more cardiac chambers are superimposed at the boundary positions.

11. The ultrasound diagnostic apparatus of claim 10, wherein the display displays, in a same display format, for each of the at least two or more cardiac chambers, information representing the boundary positions of the cardiac chamber and information representing the cardiac function indexes.

12. The ultrasound diagnostic apparatus of claim 10, wherein the processing circuitry is further configured to:
obtain respective boundary positions of the at least two or more cardiac chambers of the subject in two two-dimensional ultrasound images corresponding to an end-systolic phase and an end-diastolic phase; and
obtain cardiac function indexes for each of the at least two or more cardiac chambers based on the two two-dimensional ultrasound images.

13. The ultrasound diagnostic apparatus of claim 10, wherein the apparatus further comprises an input interface that receives a user operation while the subject undergoes ultrasound scanning; and
the processing circuitry is further configured to, in accordance with the user operation,
obtain respective boundary positions of the at least two or more cardiac chambers in the two two-dimensional ultrasound images; and
obtain the cardiac function indexes for each of the at least two or more cardiac chambers.

14. The ultrasound diagnostic apparatus of claim 10, wherein the plurality of two-dimensional ultrasound images are images based on B-mode data obtained by two-dimensional scanning.

15. The ultrasound diagnostic apparatus of claim 10, wherein the respective boundary positions of the at least two or more cardiac chambers in the plurality of two-dimensional ultrasound images are obtained by using a trained model.

* * * * *